(12) United States Patent
Chen et al.

(10) Patent No.: US 12,420,416 B2
(45) Date of Patent: Sep. 23, 2025

(54) ROBOTIC ARM CONTROL METHOD, ROBOT AND ITS CONTROLLER

(71) Applicant: Shenzhen Pengxing Intelligent Research Co., Ltd., Shenzhen (CN)

(72) Inventors: Jin-Liang Chen, Shenzhen (CN); Xiang-Yu Chen, Shenzhen (CN)

(73) Assignee: Shenzhen Pengxing Intelligent Research Co., Ltd., Shenzhen (CN)

( * ) Notice: Subject to any disclaimer, the term of this patent is extended or adjusted under 35 U.S.C. 154(b) by 238 days.

(21) Appl. No.: 18/344,847

(22) Filed: Jun. 29, 2023

(65) Prior Publication Data

US 2024/0001553 A1   Jan. 4, 2024

(30) Foreign Application Priority Data

Jun. 29, 2022   (CN) .......................... 202210748951.1

(51) Int. Cl.
*B25J 9/16*  (2006.01)
*B25J 13/08*  (2006.01)

(52) U.S. Cl.
CPC .......... *B25J 9/1664* (2013.01); *B25J 9/1694* (2013.01); *B25J 13/085* (2013.01)

(58) Field of Classification Search
CPC . B25J 9/16; B25J 9/1664; B25J 9/1694; B25J 13/085

See application file for complete search history.

(56) References Cited

U.S. PATENT DOCUMENTS

| | | | |
|---|---|---|---|
| 9,592,608 B1* | 3/2017 | Bingham | G05B 19/423 |
| 9,919,427 B1* | 3/2018 | Guilbert | B25J 9/1664 |
| 11,203,120 B1* | 12/2021 | Hill | B25J 9/0087 |
| 2014/0067126 A1* | 3/2014 | Watanabe | G06T 7/75 |
| | | | 382/103 |
| 2020/0012287 A1* | 1/2020 | Lee | G01S 17/931 |
| 2022/0168899 A1* | 6/2022 | Boroushaki | G06K 19/0723 |

FOREIGN PATENT DOCUMENTS

| | | |
|---|---|---|
| CN | 111251277 A | 6/2020 |
| CN | 114102585 A | 3/2022 |

* cited by examiner

*Primary Examiner* — Khoi H Tran
*Assistant Examiner* — Nhi Q Bui
(74) *Attorney, Agent, or Firm* — ScienBiziP, P.C.

(57) ABSTRACT

A robotic arm control method, a robot and it's controller are provided, the method includes: receiving an instruction to identify a target object to be operated; responsive to that the fixed portion is beyond a first location area, controlling the robot to move, until a fixed portion of a first mechanical arm of the robot is within the first location area; responsive to that the fixed portion is within the first location area, receiving a control instruction for operating the target object, invoking trajectory parameters of an end effector of the first mechanical arm relative to the target object, and obtaining a target posture of the end effector relative to the target object; controlling the end effector to reach and operate the target object directly or through a tool according to the trajectory parameters and the target posture.

17 Claims, 11 Drawing Sheets

ROBOTIC ARM CONTROL METHOD, ROBOT AND ITS CONTROLLER

CROSS-REFERENCE TO RELATED APPLICATIONS

This application claims priority to Chinese Patent Application No. 202210748951.1 filed on Jun. 29, 2022 in China National Intellectual Property Administration, the contents of which are incorporated by reference herein.

FIELD

The subject matter herein generally relates to robot technology, and particularly to a method for controlling robot, a robot, and a control terminal of the robot.

BACKGROUND

Kinesthetic demonstration means that an operator can drag an end effector of a robot from an initial pose to a specified pose to perform a task. In the kinesthetic demonstration of the robot, the robot records a trajectory of the end effector performing the task according to a certain time step, so that the recorded trajectory can be reproduced when a same task is performed next time.

However, when the robot performs tasks autonomously, a robot body cannot move to the same position as last time due to the movement error of the robot body, or due to obstacles, resulting in there is a certain distance between the initial pose of the end effector of the robot and the initial pose when kinesthetic demonstration. There may be an error between a movement trajectory of the end effector of the robot and the recorded trajectory, and there will also be a difference between the final pose of the end effector and the specified pose, so that situations of failure of performing the same task by direct replicating taught trajectory may be occurred.

In addition, when the robot performs tasks autonomously, the position of a target object changes, and there is an error between an actual initial pose of the end effector of the robot relative to the target object and the recorded initial pose, resulting in there are errors between the movement trajectory of the end effector of the robot and the recorded trajectory, and there will also be differences between the final pose of the end effector and the specified pose, so that situations of failure of performing the same task by direct replicating taught trajectory may be occurred. For example, the target object to be operated can be a cup, which is placed on a dining table, since the position of the cup on the dining table is different each time, when the robot performs the task of grabbing the cup, it needs to move the robot body to a suitable position every time, the initial pose of the end effector needs to be adjusted before performing the tasks. However, errors of the initial pose of the end effector may be occurred, which leads to the failure of the task of grasping the cup.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
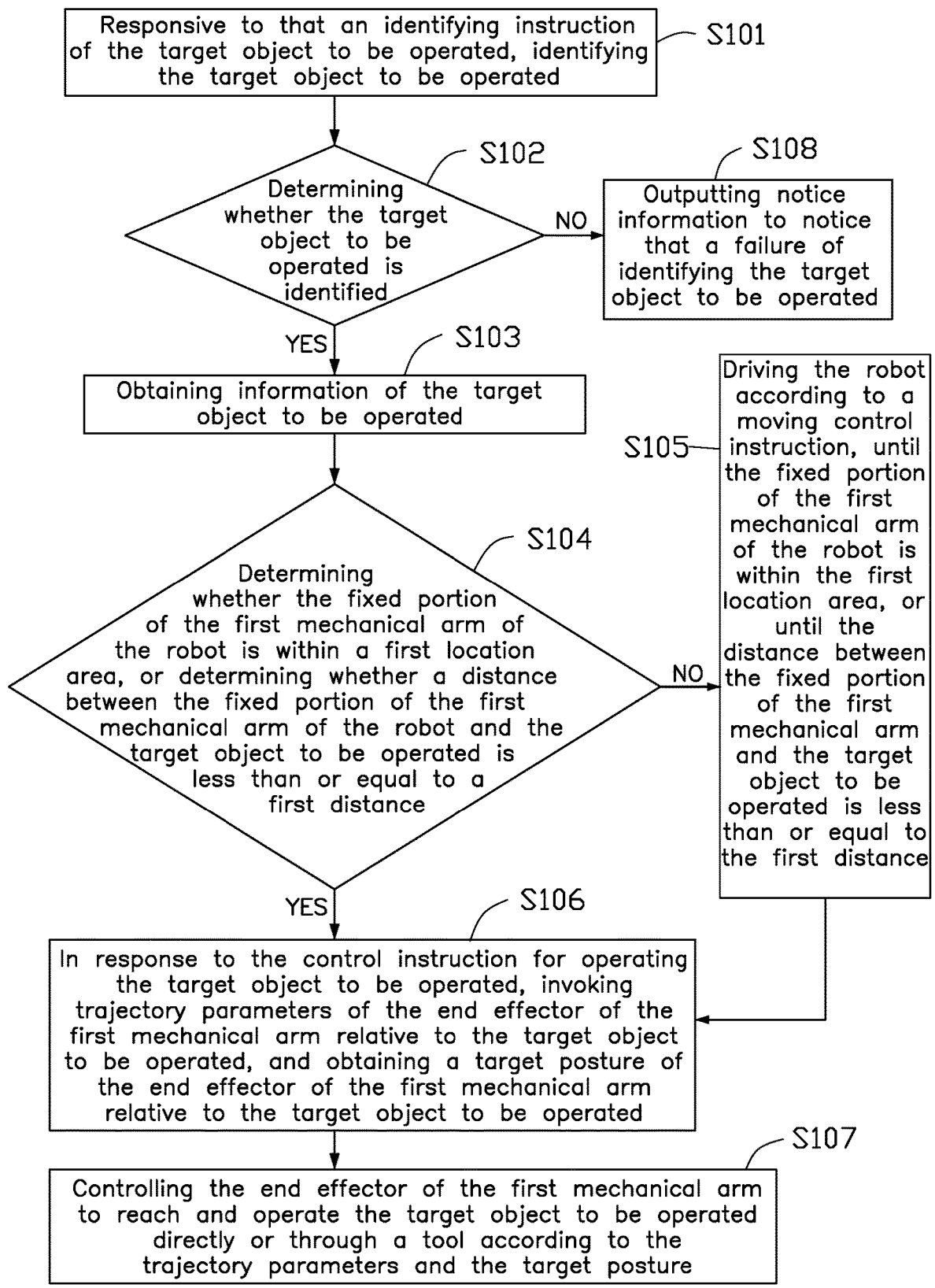
FIG. 1 illustrates a flow chart of at least one embodiment of a method for controlling mechanical arm according to the present disclosure.

Implementations of the disclosure will now be described, by way of embodiments only, with reference to the drawings. The disclosure is illustrative only, and changes can be made in the detail within the principles of the present disclosure. It will, therefore, be appreciated that the embodiments can be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape or other word that the term modifies, such that the component need not be exact. The term "comprising," when utilized, means "including, but not necessarily limited to", it specifically indicates open-ended inclusion or membership in the so-described combination, group, series, and the like.

Those skilled in the art should understand that, in the disclosure of the present disclosure, the terms "longitudinal", "lateral", "upper", "lower", "front", "rear", "left", "right", the orientation or positional relationship indicated by "vertical", "horizontal", "top", "bottom", "inner", "outer", etc. are based on the orientation or positional relationship shown in the drawings, which are only for the convenience of describing the present disclosure and to simplify the description, rather than indicating or implying that the device or element referred to must have a specific orientation, or be constructed and operated in a specific orientation, so the above terms should not be understood as limiting the present disclosure.

It can be understood that the term "a" should be understood as "at least one" or "one or more", that is, in one embodiment, the number of an element can be one, and in another embodiment, the number of the elements can be more than one, and the term "one" cannot be taken as a restriction on actual number.

A first aspect of the present disclosure provides a method for controlling mechanical arm. FIG. 1 illustrates a flow chart of at least one embodiment of a method for controlling mechanical arm according to the present disclosure.

A robot provided by the present disclosure can include only one mechanical arm or a plurality of mechanical arms, such as a first mechanical arm, a second mechanical arm, etc. Each mechanical arm includes a fixed portion. For better description, the first mechanical arm and the fixed portion of the first mechanical arm (hereinafter "fixed portion") are set for examples throughout the embodiments.

The method for controlling mechanical arm of the present disclosure can be applied in the robot. The robot at least includes a body and the first mechanical arm. The first mechanical arm includes an end effector and the fixed portion. The end effector is configured to touch and operate to a target object to be operated. The fixed portion is fixed on the body of the robot and configured to connect the first mechanical arm to the body. The fixed portion can be a component of a conjunction of the first mechanical arm and the body, or a component of a conjunction of the first mechanical arm connected to the body through a connecting unit. The fixed portion can be rest relative to the body of the robot, or a portion of the fixed portion can be rest relative to the body of the robot. The fixed portion can have a geometric center, the geometric center of the fixed portion can be rest relative to the body of the robot. For instance, when the body of the robot is still and the first mechanical arm is moving, the fixed portion can rotate along with the movement of the first mechanical arm, but the geometric center of the fixed portion is rest relative to the body of the robot. For instance, when the body of the robot is moving, the fixed portion can move along with the movement of the body, but the geometric center of the fixed portion is rest relative to the body of the robot.

Referring to FIG. 1, the method for controlling mechanical arm includes:

At block S101, responsive to that an identifying instruction of the target object to be operated, identifying the target object to be operated.

The identifying instruction is configured to instruct the robot to identify the target object to be operated.

In at least one embodiment, when the robot receives the identifying instruction, the robot may use a vision sensor to detect surrounding environment to identify the target object to be operated. The vision sensor may be a camera, a lidar, a depth camera, a laser radar, a three-dimensional (3D) camera, etc., not limited by the present disclosure.

At block S102, determining whether the target object to be operated is identified.

In at least one embodiment, the robot identifies the target object to be operated in the surrounding environment, if the target object to be operated is identified, the procedure goes to blocks S103 to S107; otherwise, the procedure goes to block S108.

At block S103, obtaining information of the target object to be operated.

In at least one embodiment, the information of the target object to be operated may include visual information and location information. The visual information may include depth images of the target object to be operated. The location information may include location information of the target object to be operated and the robot in a second map interface. The second map interface can be displayed by a display panel of the robot, the second map interface displays a map of a certain location range that established by the robot, the robot can update the map according to location information during its movement, the second map interface can synchronously display the updated map.

In at least one embodiment, the map displayed by the second map interface can be an occupancy grid map. The occupancy grid map represents an environment map as a field of evenly spaced binary random values, each of the binary random values represents a presence or absence of an obstacle at the location in the environment. The occupancy grid map can describe obstacles and free space in the environment, which can be a representation of a map for the robot to execute autonomous navigation and trajectory planning.

In at least one embodiment, in response to the control instruction, the robot can detect surrounding environment through the vision sensor (such as a 3D camera), perform mapping identification to the surrounding environment using Simultaneous Localization and Mapping (SLAM) technology, and determine the locations of the robot and the target object to be operated in the map according to a result of the mapping identification, that is obtaining the location information of the robot and the target object to be operated. Then the robot can perform autonomous navigation to move close to the target object to be operated according to the location information of the robot and the target object to be operated, and capture the target object to be operated using the vision sensor to obtain the visual information of the target object to be operated.

Using the SLAM technology, the robot can move from an unknown location in an unknown environment, perform self-positioning when moving according to the location and the map, and establish an incremental map based on the self-positioning, so as to achieve the self-positioning and autonomous navigation of the robot.

For instance, when the robot is indoor and receives control instruction input by audio or text, such as "open the bedroom door for me", the robot may determine a task to be operated (that is "open the bedroom door") and the target object to be operated (that is "a handle of the bedroom door") from the control instruction by keyword or semantic analysis. Then, in response to the control instruction, the robot performs mapping identification to the indoor environment to identify cubical spaces (such as living room, bedroom, study room, etc.) in the indoor environment. After that, the robot determines the locations of the robot and the target object to be operated in the map according to a result of the mapping identification, and move close to the target object to be operated (such as moving to a front of the bedroom door) according to the location information of the robot and the target object to be operated. Then the robot captures the target object to be operated using the vision sensor to obtain the visual information of the target object to be operated.

In at least one embodiment, the vision sensor can also be an image capturing device or a camera device throughout the description.

In other embodiments, the planning trajectory from the location of the robot to the target object to be operated can be set by the user through the display panel of the robot or the control terminal, the planning trajectory can instruct the robot to move to the target object to be operated.

At block S104, determining whether the fixed portion of the first mechanical arm of the robot is within a first location area, or determining whether a distance between the fixed portion of the first mechanical arm of the robot and the target object to be operated is less than or equal to a first distance.

The first distance is a maximum distance of the end effector of the first mechanical arm can reach and operate the target object to be operated directly or through a tool. The first location area is a location area of the end effector of the first mechanical arm can reach and operate the target object to be operated directly or through a tool. In detail, the first location area is a location area formed by minimum locations and maximum locations between the fixed portion of the first mechanical arm and the target object to be operated, when the end effector of the first mechanical arm can reach and operate the target object to be operated directly or through a tool. It should be known that, the first location area is a tridimensional location area surrounding the target object to be operated, such as a high spot of the target object to be operated, the robot may need to move to below of the target object to be operated to reach the target object to be operated through the first mechanical arm. In addition, if the first mechanical arm may be provided with a tool, which is not a part of the first mechanical arm, the first mechanical arm may operate the target object to be operated through the tool, when the robot determines the first location area, the robot may calculate a length of the tool, the first location area in this situation has a greater location area comparing to the first mechanical arm directly reaches and operates the target object to be operated.

The robot may obtain the distance between the fixed portion of the first mechanical arm and the target object to be operated through one or more devices, such as laser radar, vision sensor, range sensor, other sensors, etc.

For convenient description, the end effector of the first mechanical arm directly reaching and operating the target object to be operated is set for example hereinafter.

For instance, when the target object to be operated is a door handle, the end effector of the first mechanical arm can reach the door handle, determining minimum locations and maximum locations between the fixed portion of the first mechanical arm and the door handle as the first location area. The first mechanical arm extends to a maximum distance when the first mechanical arm reaches the door handle, the maximum distance is a first distance, at this time the fixed portion of the first mechanical arm is farthest away from the door handle. The first mechanical arm extends to a minimum distance when the first mechanical arm reaches the door handle, at this time the fixed portion of the first mechanical arm is nearest to the door handle. Thus, the location range of the maximum distance and the minimum distance between the fixed portion of the first mechanical arm and door handle is the first location area. When the fixed portion of the first mechanical arm is within the first location area, the end effector of the first mechanical arm can reach the target object to be operated can be determined. In at least one embodiment, the position of the body of the robot may not block the movement of the target object to be operated. For instance, when the robot moves to the front of the door, adjusting the position of the body of the robot and driving the first mechanical arm, rendering the end effector of the first mechanical arm can reach the door handle, the position of the body of the robot is beyond a movable range of the door, so the body of the robot may not block the opening or closing of the door. In another embodiment, when the body of the robot blocks the movement of the target object to be operated, moving the body of the robot during the end effector of the first mechanical arm moving towards the target object to be operated or meanwhile the end effector of the first mechanical arm reaches and operates the target object to be operated, until the body of the robot does not block the movement of the target object to be operated.

For instance, when the target object to be operated is a cup on a table, the end effector of the first mechanical arm can reach the cup, determining minimum locations and maximum locations between the fixed portion of the first mechanical arm and the cup. The location range formed by the minimum locations and maximum locations between the fixed portion of the first mechanical arm and the cup is the first location area. When the robot moves to an edge of the table, the body of the robot can moves along the edge of the table or passes through below the table, adjusting the position of the body of the robot and driving the first mechanical arm, rendering the end effector of the first mechanical arm can reach the cup on the table. The first location area is changeable according to the position change of the target object to be operated.

In the block S104, if the fixed portion of the first mechanical arm is within the first location area, or the distance between the fixed portion of the first mechanical arm and the target object to be operated is less than or equal to the first distance, the procedure goes to blocks S106 to S107; otherwise, the procedure goes to blocks S105 to S107.

At block S105, driving the robot according to a moving control instruction, until the fixed portion of the first mechanical arm of the robot is within the first location area, or until the distance between the fixed portion of the first mechanical arm and the target object to be operated is less than or equal to the first distance.

The moving control instruction is configured to instruct the body of the robot to move.

The moving control instruction may be transmitted from a control module of the body of the robot to a motor driving board, or calculated by and transmitted from a cloud server to the body of the robot, or transmitted from an external control terminal. For instance, if the robot has autonomous navigation function, the robot can calculate a navigating trajectory according to a destination and a present location of the body of the robot, and control the robot to move to the destination. For instance, if the body of the robot is driven by a control terminal, the control terminal transmits a moving control instruction to the body of the robot to control the body of the robot to move to the destination.

In at least one embodiment, when the fixed portion of the first mechanical arm is beyond the first location area, or when the distance between the fixed portion of the first mechanical arm and the target object to be operated is greater than the first distance, the robot can obtain the location information of the target object to be operated in the map from the location information, combine with the present location information of the robot, controlling the body of the robot to move towards the location of the target object to be operated, until the fixed portion of the first mechanical arm is within the first location area, or until the distance between the fixed portion of the first mechanical arm and the target object to be operated is less than or equal to the first distance, so the end effector of the first mechanical arm can reach and operate the target object to be operated directly or through a tool.

The robot may move to the fixed portion of the first mechanical arm is within the first location area, then the body of the robot stops, activating the end effector of the first mechanical arm to reach and operate the target object to be operated directly or through a tool. Or, during the continuous movement of the body of the robot, when the end effector of the first mechanical arm is located in a suitable location in the first location area, activating the end effector of the first mechanical arm to reach and operate the target object to be operated directly or through a tool.

Or, during the continuous movement of the body of the robot, the end effector of the first mechanical arm is moving relative to the body of the robot, when the end effector of the first mechanical arm is located in a suitable location in the first location area, the end effector of the first mechanical arm can select a suitable moving trajectory to operate the target object to be operated according to its present location.

In detail, when the fixed portion of the first mechanical arm is beyond the first location area, or when the distance between the fixed portion of the first mechanical arm and the target object to be operated is greater than the first distance, the robot can obtain the location information of the target object to be operated in the map from the location information, calculate a trajectory of the robot moving from the present location to the target object to be operated in the map according to the location information of the target object to be operated and the present location of the robot, the robot moves along the trajectory until the fixed portion of the first mechanical arm is within the first location area, or until the distance between the fixed portion of the first mechanical arm and the target object to be operated is less than or equal to the first distance. It should be known that, when there are a plurality of trajectories from the present location of the robot to the target object to be operated are calculated, the robot can randomly select one of the plurality of trajectories, or select a shortest trajectory for moving.

At block S106, in response to the control instruction for operating the target object to be operated, invoking trajectory parameters of the end effector of the first mechanical arm relative to the target object to be operated, and obtaining a target posture of the end effector of the first mechanical arm relative to the target object to be operated.

The control instruction is configured to notice the robot to execute the task. For instance, the control instruction for operating the target object to be operated is configured to notice the robot that the task to be executed is to operate the target object to be operated.

In at least one embodiment, the user may directly transmit the control instruction to the robot, or using the control terminal to transmit the control instruction to the robot.

In detail, the user may directly transmit the control instruction to the robot by following ways: audio/text input, touch operation, gesture actions, etc. For instance, the user may directly input text content through the control panel on the robot, the robot may obtain the control instruction by keywords or semantic analysis from the text content. For instance, the user may make audio content in an audio sensing range of the robot, the robot can receive the audio content through an audio module and convert the audio content into text content, obtain control instruction by keywords or semantic analysis from the text content. For instance, the user may trigger a control of the control panel by touch operation, each control is corresponding to a control instruction, when a certain control is triggered by the user, the robot can obtain a corresponding control instruction. For instance, the user may make a gesture action in a capturing range of the robot, the robot can identify the gesture action by the vision sensor and obtain the control instruction from the gesture action through fuzzy recognition algorithm.

When the user transmits the control instruction to the robot through the control terminal, the user may trigger the control of an application of the control terminal to trigger the control instruction. The control terminal can manage the robot through the application, the application includes controls corresponding to different functions of the robot, such as environment/object identifying, autonomous navigation/movement, track/trajectory planning, smart handling, etc.

The trajectory parameters of the end effector of the first mechanical arm relative to the target object to be operated mean trajectory parameters of the end effector of the first mechanical arm reaches and operates the target object to be operated directly or through a tool. For instance, when the target object to be operated is the door handle, the trajectory parameters of the end effector of the first mechanical arm relative to the target object to be operated mean trajectory parameters of the end effector of the first mechanical arm reaches the door handle and opens the door directly or through a tool.

The robot stores the trajectory parameters of the end effector of the first mechanical arm relative to the target object to be operated, the trajectory parameters can be stored in a memory of the robot, a cloud server, or the control terminal of the robot. When the fixed portion of the first mechanical arm is within the first location area, or the distance between the fixed portion of the first mechanical arm and the target object to be operated is less than or equal to the first distance, and when the target object to be operated is needed to be operated, the robot receives the control instruction of operating the target object to be operated, invoking the corresponding trajectory parameters and obtaining corresponding target posture.

At block S107, controlling the end effector of the first mechanical arm to reach and operate the target object to be operated directly or through a tool according to the trajectory parameters and the target posture.

In at least one embodiment, before the end effector of the first mechanical arm reaches and operates the target object to be operated directly or through a tool, the robot invokes the vision sensor to capture an image of the target object to be operated, to obtain the visual information of the target object to be operated, obtains a depth image of the target object to be operated from the visual information, executes positional shift from a camera coordinate system to a robot coordinate system according to the depth image, so as to determine the target posture of the end effector of the first mechanical arm relative to the target object to be operated.

In at least one embodiment, the robot controls the end effector to move along the trajectory corresponding to the trajectory parameters, until the end effector reaches the target posture relative to the target object to be operated, so the end effector of the first mechanical arm can reach and operate the target object to be operated directly or through a tool. For instance, when the target object to be operated is the door handle, the robot controls the end effector to move along the trajectory corresponding to the trajectory parameters, until the end effector reaches the target posture relative to the door handle, so the end effector of the first mechanical arm can directly or indirectly through a tool reaches the door handle, and opens the door through operating on the door handle.

At block S108, outputting notice information to notice that a failure of identifying the target object to be operated.

In at least one embodiment, when the robot dose not identify the target object to be operated in the surrounding environment, the robot may output notice information through the audio module or the display panel, the notice information is configured to notice that a failure of identifying the target object to be operated.

In at least one embodiment, the robot determines whether the fixed portion of the first mechanical arm is within the first location area according to the location information of the target object to be operated, or determines whether the distance between the fixed portion of the first mechanical arm and the target object to be operated is less than or equal to the first distance, to determine whether the robot moves close to the target object to be operated. If the fixed portion of the first mechanical arm is beyond the first location area, or when the distance between the fixed portion of the first mechanical arm and the target object to be operated is greater than the first distance, controlling the robot to move until fixed portion of the first mechanical arm is within the first location area, or until the distance between the fixed portion of the first mechanical arm and the target object to be operated is less than or equal to the first distance, so as to precisely control the robot to move close to the target object to be operated. If the fixed portion of the first mechanical arm is within the first location area, or until the distance between the fixed portion of the first mechanical arm and the target object to be operated is less than or equal to the first distance, obtaining the target posture of the end effector of the first mechanical arm relative to the target object to be operated, and invoking the trajectory parameters of the end effector of the first mechanical arm relative to the target object to be operated. Controlling the end effector of the first mechanical arm to reach and operate the target object to be operated directly or through a tool according to the trajectory parameters and the target posture, which may reproduce demonstration trajectory, so as to successfully execute the task of operating the target object to be operated.

Figure 2:
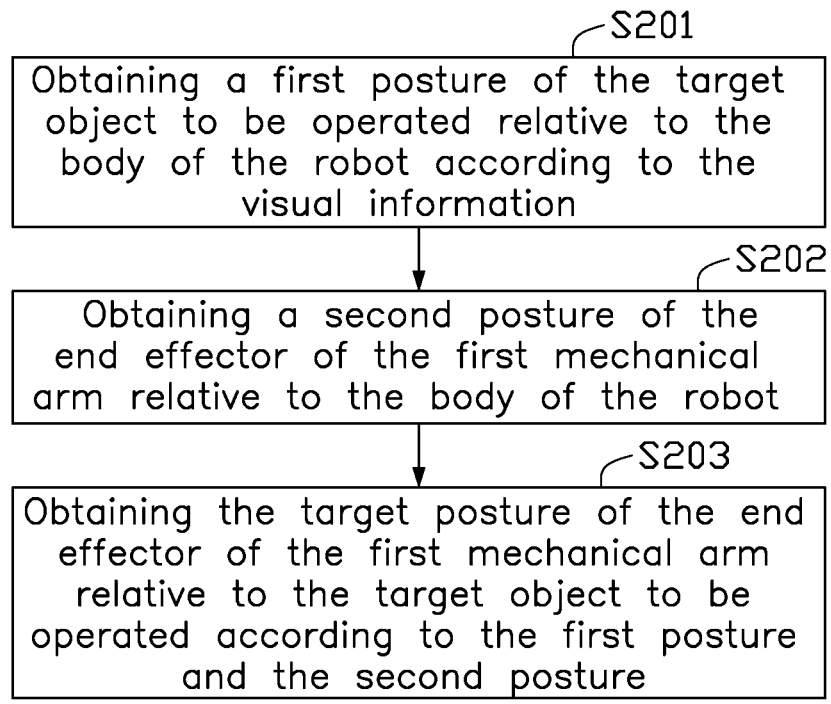
FIG. 2 illustrates a sub-flow chart of at least one embodiment of a block S106 of the method as shown in FIG. 1.

FIG. 2 illustrates a sub-flow chart of the block S106 of the method as shown in FIG. 1. Referring to FIG. 2, obtaining the target posture of the end effector of the first mechanical arm relative to the target object to be operated, may further include:

At block S201, obtaining a first posture of the target object to be operated relative to the body of the robot according to the visual information.

In at least one embodiment, when the fixed portion of the first mechanical arm is within the first location area, or the distance between the fixed portion of the first mechanical arm and the target object to be operated is less than or equal to the first distance, the robot invokes the vision sensor to capture the image of the target object to be operated, to obtain the visual information of the target object to be operated, obtains the depth image of the target object to be operated from the visual information, and obtains the first posture of the target object to be operated relative to the body of the robot according to the depth image.

In detail, the robot obtains a posture $_{obj}^{camera}T$ of the target object to be operated in the camera coordinate system according to the depth image, that is $_{obj}^{camera}T$ is a posture of the target object to be operated relative to the vision sensor. Then the robot calculates to obtain a posture $_{camera}^{base}T$ of the vision sensor relative to the body of the robot through hand-eye calibration. Then the robot calculates to obtain the first posture $_{camera}^{base}T$, $_{obj}^{camera}T$ of the target object to be operated relative to the body of the robot according to the posture $_{obj}^{camera}T$ of the target object to be operated relative to the vision sensor and the posture $_{camera}^{base}T$ of the vision sensor relative to the body of the robot.

The hand-eye calibration can be determining a position shift relationship between the camera coordinate system and the robot coordinate system, so the object posture determined by the vision sensor can be converted to the robot coordinate system, the first mechanical arm of the robot operates the object.

At block S202, obtaining a second posture of the end effector of the first mechanical arm relative to the body of the robot.

In at least one embodiment, the robot calculates to obtain the second posture $_{eff}^{base}T$ of the end effector of the first mechanical arm relative to the body of the robot through a forward kinematics of the first mechanical arm.

The forward kinematics can be a solution procedure of the position posture of the end effector of the first mechanical arm according to positions or corners of the mechanical structural of the known mechanical arm relative to joints of the robot.

At block S203, obtaining the target posture of the end effector of the first mechanical arm relative to the target object to be operated according to the first posture and the second posture.

In at least one embodiment, the robot calculates to obtain the target posture $$_{eff}^{obj}T = \frac{_{eff}^{base}T}{_{camera}^{base}T \cdot _{obj}^{camera}T}$$

of the end effector of the first mechanical arm relative to the target object to be operated according to the first posture $_{camera}^{base}T$, $_{obj}^{camera}T$ and the second posture $_{eff}^{base}T$.

Figure 3:
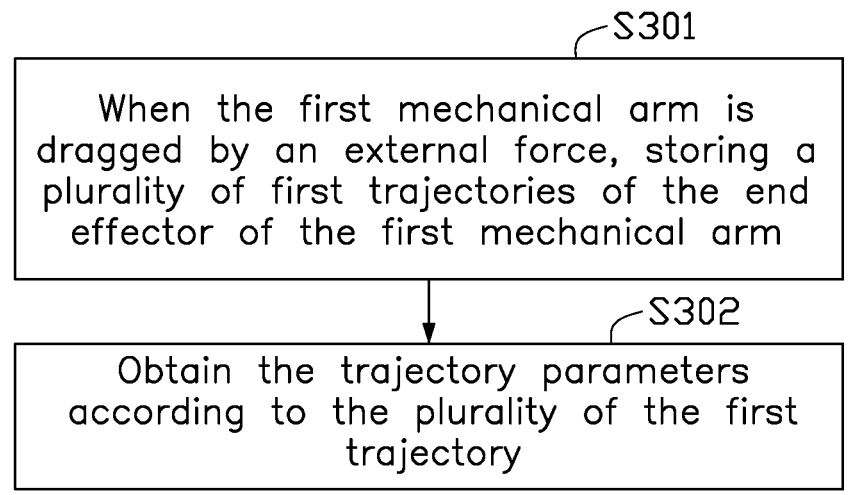
FIG. 3 illustrates a flow chart of at least one embodiment of a robot obtaining trajectory parameters in a kinesthetic demonstration scene according to the present disclosure.

FIG. 3 illustrates a flow chart of the robot obtaining the trajectory parameters in a kinesthetic demonstration scene. Before the block S101 as shown in FIG. 1, the method for controlling mechanical arm further includes:

At block S301, when the first mechanical arm is dragged by an external force, storing a plurality of first trajectories of the end effector of the first mechanical arm.

The first trajectory means a trajectory of the end effector of the first mechanical arm moving from beginning to reaching and operating the target object to be operated directly or through a tool under the action of the external force.

In at least one embodiment, during a learn from demonstration procedure, the user drags the first mechanical arm to execute the task, the robot records trajectory points of the end effector of the first mechanical arm executing the action according to predetermined time step, a gather of the trajectory points forms the first trajectory. The user may drag the first mechanical arm to execute the task for several times, so the robot may store a plurality of first trajectories.

For instance, if the target object to be operated is the door handle, during the learn from demonstration procedure, the user drags the first mechanical arm to open the door, the robot records trajectory points of the end effector of the first mechanical arm from beginning to reaching and operating the door handle to open the door according to the predetermined time step, to obtain the first trajectory.

At block S302, obtain the trajectory parameters according to the plurality of the first trajectories.

In at least one embodiment, the robot may fit the plurality of the first trajectories by probabilistic learning method using Gaussian Mixture Models (GMM), to obtain a probability distribution of generalized trajectories as shown in formula (1):

$$\dot{\varepsilon}=f(\varepsilon)=\Sigma_{k=1}^{k}\gamma_k(\varepsilon)(A_k\varepsilon+b_k) \quad (1)$$

$\dot{\varepsilon}$ is the probability distribution of state space values of generalized trajectories (such as a velocity and an acceleration of the robot in different time points), k is a quantity of the first trajectories, $\gamma_k(\varepsilon)$ is a function of the GMM, $\gamma_k(\varepsilon)$ is configured to describe the probability distribution of state space values of the first trajectory, $(A_k\varepsilon+b_k)$ is a linear gather of the state space values, $A_k$ and $b_k$ are trajectory parameters of the generalized trajectories.

According to the probability distribution of the generalized trajectories shown the formular (1), by an estimation of the trajectory parameters using Expectation Maximization (EM) algorithm, obtaining a trajectory generalized model. The trajectory parameters of the trajectory generalized model is the trajectory parameters of the kinesthetic demonstration. The EM algorithm is configured to calculate to obtain a trajectory with the greatest probability.

In other embodiments, before fitting the quantity of the first trajectories, smoothing the quantity of the first trajectories to abnormal filter trajectory points, so as to improve a fitting effect.

During an autonomous executing procedure of the robot, a predicted trajectory can be obtained by calculating through the trajectory generalized model, the robot executes the task according to the predicted trajectory. Comparing to directly invoking the first trajectories, performing parameterized process to the quantity of the first trajectories through the trajectory generalized method of the present embodiment, to obtain the predicted trajectory, which allows a trajectory difference with a certain range, so as to improve a success rate of executing the task.

Figure 4:
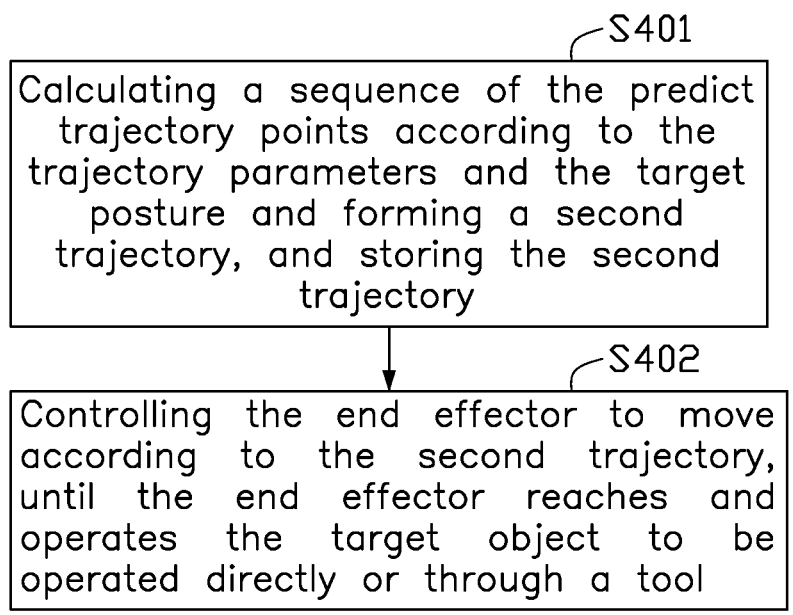
FIG. 4 illustrates a sub-flow chart of at least one embodiment of a block S107 of the method as shown in FIG. 1.

Referring to FIGS. 3 and 4, FIG. 4 illustrates a sub-flow chart of the block S107 of the method as shown in FIG. 1. After the block S302 as shown in FIG. 3, controlling the end effector of the first mechanical arm to reach and operate the target object to be operated directly or through a tool according to the trajectory parameters and the target posture, may further include:

At block S401, calculating a sequence of the predicted trajectory points according to the trajectory parameters and the target posture and forming a second trajectory, and storing the second trajectory.

The trajectory parameters of the present embodiment may be trajectory parameters of the trajectory generalized model.

In at least one embodiment, during the autonomous executing procedure of the robot, the robot can obtain the predicted trajectory by calculating through the trajectory generalized model, controlling the end effector of the first mechanical arm of the robot to move based on the predicted trajectory, so as to calculate the sequence of the predicted trajectory points and form the second trajectory.

At block S402, controlling the end effector to move according to the second trajectory, until the end effector reaches and operates the target object to be operated directly or through a tool.

The second trajectory is a trajectory of the end effector of the first mechanical arm of the robot moving from beginning to the target posture of the end effector relative to the target object to be operated.

In at least one embodiment, during the autonomous executing procedure of the robot, the robot can control the end effector to move according to the second trajectory, until the end effector reaches and operates the target object to be operated directly or through a tool. The second trajectory through the trajectory generalized allows a trajectory difference with a certain range, so as to improve a success rate of executing the task.

The trajectory parameters of the robot can be continuously iterated, obtaining a plurality of second trajectories based on the trajectory parameters of the kinesthetic demonstration, combining the plurality of first trajectories, the trajectory parameters can be continuously optimized.

In at least one embodiment, the robot controls the end effector to move along the second trajectory or a part of the second trajectory. For instance, during the autonomous executing procedure of the robot, the robot controls the end effector to move according to the second trajectory, if a beginning position of the end effector moves is not any trajectory point of the second trajectory, firstly controlling the end effector of the robot to move to a certain trajectory point of the second trajectory, then controlling the end effector to move along the second trajectory. The certain trajectory point can be any one trajectory point of the second trajectory, or a trajectory point of the second trajectory closest to the position of the end effector.

Figure 5:
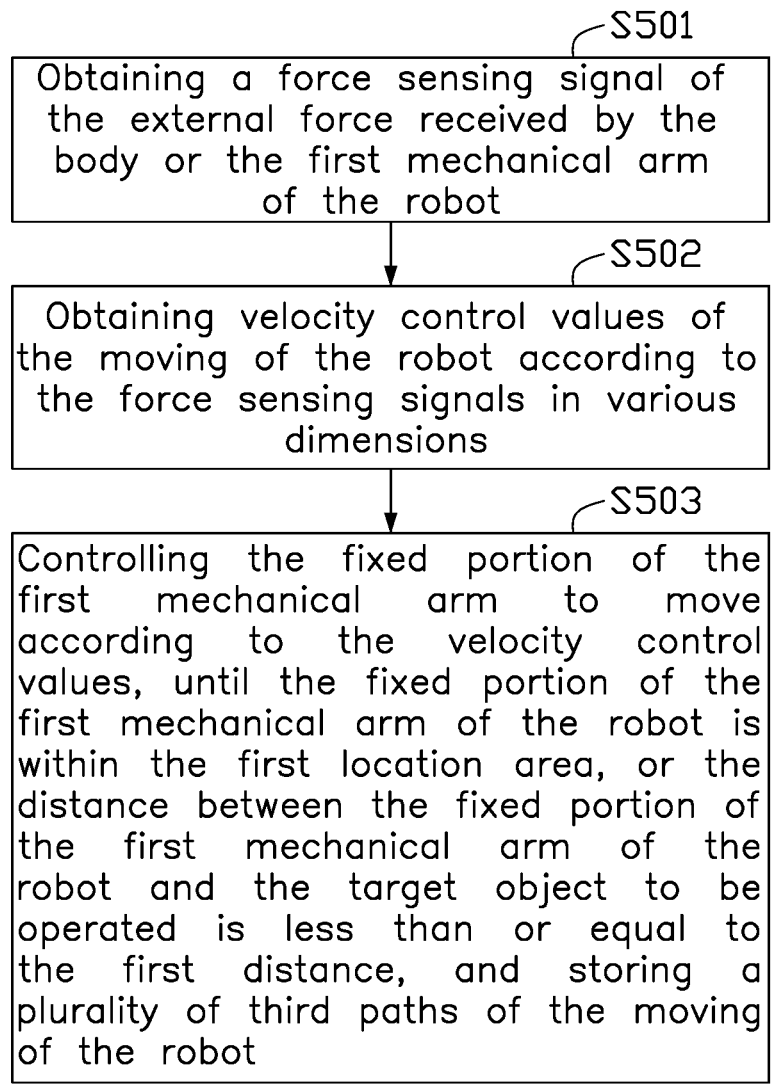
FIG. 5 illustrates a flow chart of at least one embodiment of a method for controlling mechanical arm before a block S105 of the method as shown in FIG. 1.

Referring to FIG. 5, before the block S105 as shown in FIG. 1, the method further includes:

Obtaining a moving trajectory of the robot when the fixed portion of the first mechanical arm moves to the first location area.

Wherein obtaining the moving trajectory of the robot when the fixed portion of the first mechanical arm moves to the first location area, further includes:

At block S501, obtaining a force sensing signal of the external force received by the body or the first mechanical arm of the robot.

The external force received by the robot may include the external force received by the first mechanical arm of the robot or the external force received by the body of the robot.

In at least one embodiment, when the user drags the first mechanical arm, the first mechanical arm receives the external force, a sensor (such as a six-component force sensor or a joint torque sensor) on the first mechanical arm or a movement structure (such as the wheels or legs) of the robot detects a force signal, to obtain the force sensing signal.

In another embodiment, when the user drags the body of the robot, the body of the robot receives the external force, the movement structure (such as the wheels or legs) of the robot detects a force signal, to obtain the force sensing signal.

At block S502, obtaining velocity control values of the moving of the robot according to the force sensing signals in various dimensions.

In at least one embodiment, after the robot receives the force sensing signals of the external force, the robot converts the force sensing signals to Cartesian space to calculate the velocity control values of the moving of the robot. The robot may calculate to obtain the force sensing signals in the Cartesian space based on the forward kinematics, calculate differences of the force sensing signals in various dimensions, based on a corresponding relationship of the differences of the force sensing signals and the velocity control values of the moving of the robot, obtain the velocity control values corresponding to the differences of the force sensing signals.

The corresponding relationship of the differences of the force sensing signals and the velocity control values of the moving of the robot can be shown as formula (2):

$$\begin{cases} Vx = Kx(Fx_{now} - Fx_{goal}) \\ Vy = Ky(Fy_{now} - Fy_{goal}) \\ Wz = Kz(Tz_{now} - Tz_{goal}) \end{cases} \quad (2)$$

Vx, Vy, Wz are the velocity control values of the moving of the robot; Kx, Ky, Kz are corresponding coefficients; $Fx_{now}-Fx_{goal}$ is a difference of the force sensing signals of the robot in the X direction of the Cartesian space; $Fy_{now}-FY_{goal}$ is a difference of the force sensing signals of the robot in the Y direction of the Cartesian space; $Tz_{now}-Tz_{goal}$ is a difference of the force sensing signals of the robot in the Z direction (that is a Yaw angle direction) of the Cartesian space.

At block S503, controlling the fixed portion of the first mechanical arm to move according to the velocity control values, until the fixed portion of the first mechanical arm of the robot is within the first location area, or the distance between the fixed portion of the first mechanical arm of the robot and the target object to be operated is less than or equal to the first distance, and storing a plurality of third paths of the moving of the robot.

In at least one embodiment, the robot executes a space conversion to the force sensing signals of the external force, based on the corresponding relationship of the differences of the force sensing signals and the velocity control values of the moving of the robot, obtain the velocity control values corresponding to the differences of the force sensing signals, controls the robot to move according to the velocity control values, until the fixed portion of the first mechanical arm of the robot is within the first location area, or the distance between the fixed portion of the first mechanical arm of the robot and the target object to be operated is less than or equal to the first distance. During the moving of the robot, storing a plurality of third paths of the moving of the robot for providing reference trajectories for follow-up moving of the robot.

In the block S502 as shown in FIG. 5, the robot calculates to obtain the force sensing signals in the Cartesian space based on the forward kinematics, the force sensing signals may contain errors due to gravity interference, rendering the calculated velocity control values may contain errors accordingly. For decreasing the errors caused by the gravity interference, corresponding gravity compensation are needed.

Figure 6:
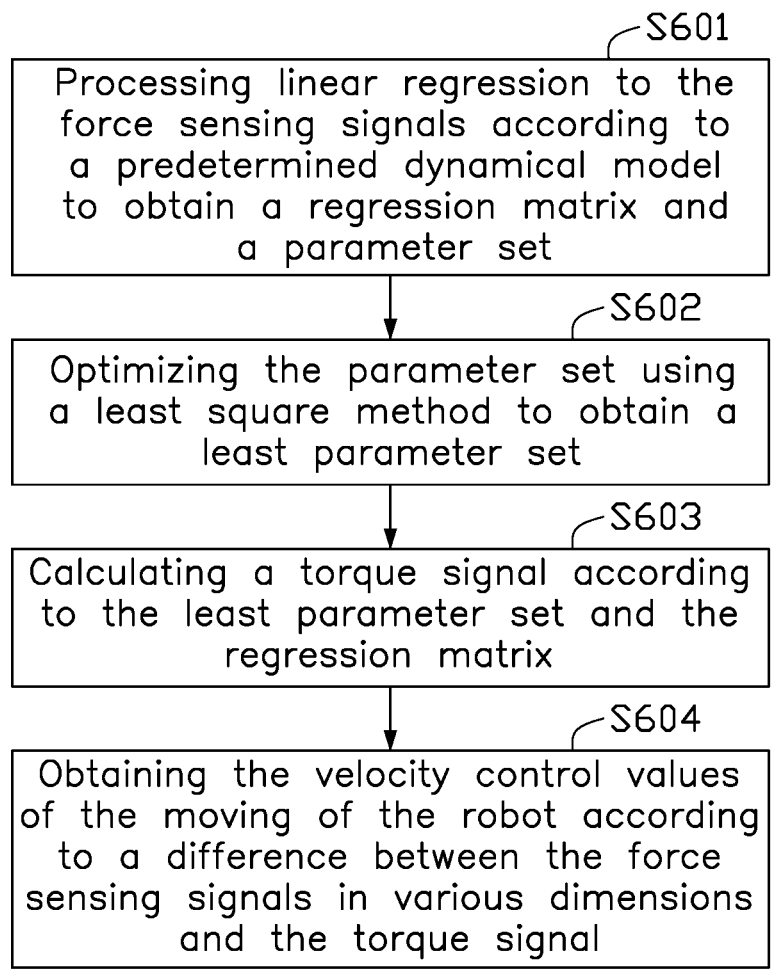
FIG. 6 illustrates a flow chart of at least one embodiment of obtaining velocity control values of the movement of the robot based on gravity compensation.

Referring to FIG. 6, obtaining the velocity control values of the moving of the robot based on gravity compensation, may include:

At block S601, processing linear regression to the force sensing signals according to a predetermined dynamical model to obtain a regression matrix and a parameter set.

In at least one embodiment, the robot may process linear regression to the force sensing signals of the external force received thereof using the predetermined dynamical model, to obtain the regression matrix of the force sensing signals and the parameter set of the dynamical model.

The dynamical model can be a model using traditional technology, which is not limited.

At block S602, optimizing the parameter set using a least square method to obtain a least parameter set.

In at least one embodiment, the robot may optimize the dynamical model using the least square method by optimizing the parameter set, such as eliminating correlation analysis in the parameter set, to obtain the least parameter set.

At block S603, calculating a torque signal according to the least parameter set and the regression matrix.

In at least one embodiment, the robot may multiply the regression matrix of the force sensing signals and the least parameter set of the dynamical model, to obtain the torque signal.

At block S604, obtaining the velocity control values of the moving of the robot according to a difference between the force sensing signals in various dimensions and the torque signal.

Subtracting the force sensing signals in various dimensions and the torque signal may counteract the gravity interference of the force sensing signals and the torque signal, which may achieve gravity compensation.

In at least one embodiment, substituting the force sensing signals in various dimensions in the block S502 as shown in FIG. 5 with the difference between the force sensing signals in various dimensions and the torque signal, to obtain the velocity control values of the moving of the robot, which may achieve gravity compensation and improve a precision of the velocity control values of the moving of the robot.

Figure 7:
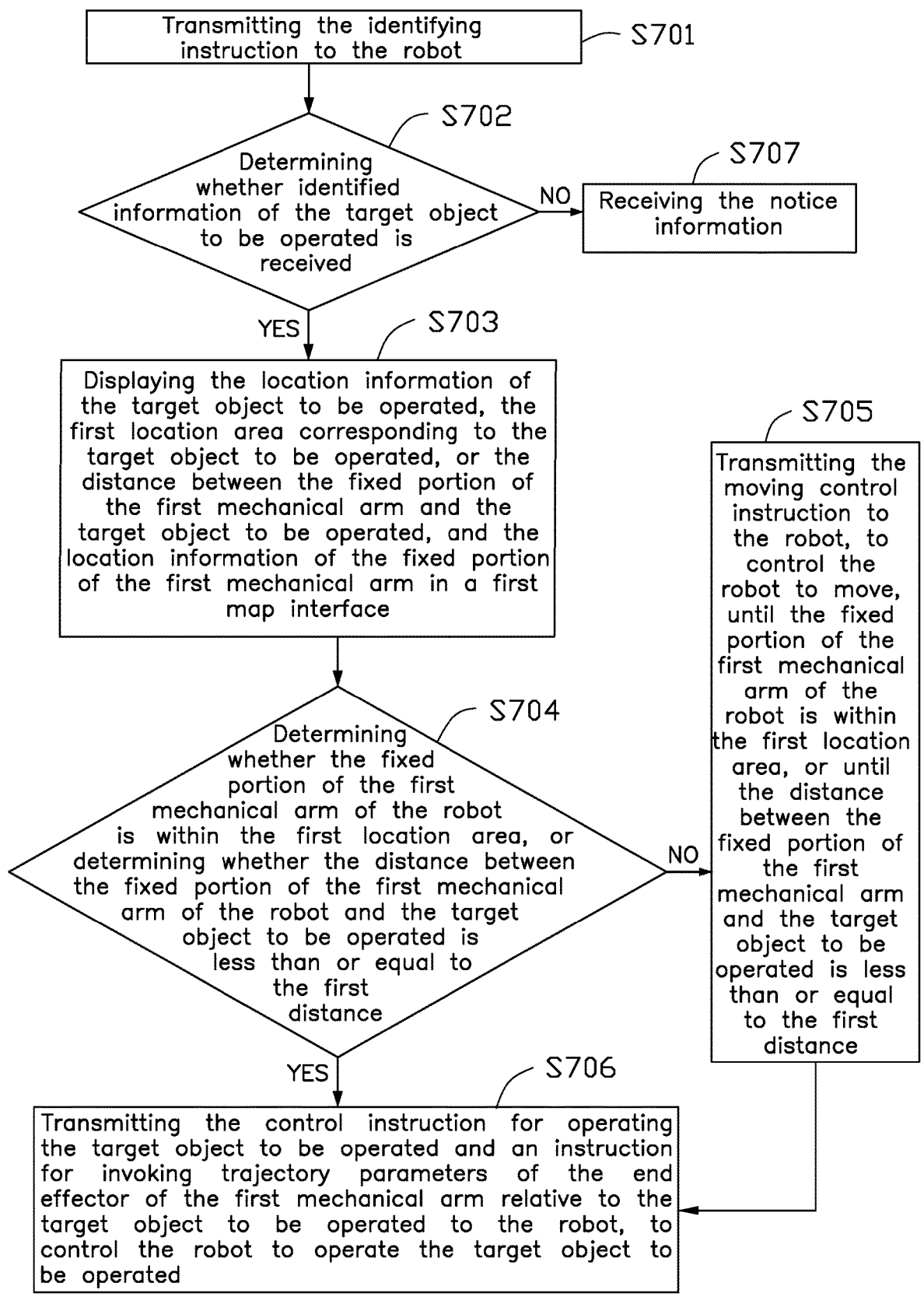
FIG. 7 illustrates a flow chart of at least one embodiment of a method for controlling robot according to the present disclosure.

FIG. 7 illustrates a flow chart of a method for controlling robot according to a second aspect of the present disclosure, the method for controlling robot can be applied in the control terminal.

FIG. 7 illustrates the method for controlling robot applied in a scene of the control terminal controlling the robot. The method for controlling robot may include:

At block S701, transmitting the identifying instruction to the robot.

The control terminal is installed with predetermined application, the application is configured to transmit the identifying instruction to the robot to control the robot to execute various functions, such as environment/object identifying, autonomous navigation/movement, track/path/trajectory planning, smart handling, etc.

In at least one embodiment, the user may trigger the identifying instruction through the application of the control terminal, the control terminal transmits the identifying instruction to the robot to control the robot to identify the target object to be operated.

At block S702, determining whether identified information of the target object to be operated is received.

In at least one embodiment, after the robot identified the target object to be operated, the robot transmits identified information of the target object to be operated to the control terminal. If the identified information of the target object to be operated is received by the control terminal, the procedure goes to blocks S703 to S706; otherwise, the procedure goes to block S707.

At block S703, displaying the location information of the target object to be operated, the first location area corresponding to the target object to be operated, or the distance between the fixed portion of the first mechanical arm and the target object to be operated, and the location information of the fixed portion of the first mechanical arm in a first map interface.

The first location area is a location area of the end effector of the first mechanical arm can reach and operate the target object to be operated directly or through a tool.

The predetermined application of the control terminal has a first map interface, when the control terminal receives the identified information of the target object to be operated, displaying the location information of the target object to be operated, the first location area corresponding to the target object to be operated, or the distance between the between the fixed portion of the first mechanical arm and the target object to be operated, and the location information of the fixed portion of the first mechanical arm in the first map interface of the predetermined application.

At block S704, determining whether the fixed portion of the first mechanical arm of the robot is within the first location area, or determining whether the distance between the fixed portion of the first mechanical arm of the robot and the target object to be operated is less than or equal to the first distance.

The first distance is a maximum distance of the end effector of the first mechanical arm can reach and operate the target object to be operated directly or through a tool.

In at least one embodiment, the control terminal determines whether the fixed portion of the first mechanical arm of the robot is within the first location area, or whether the distance between the fixed portion of the first mechanical arm of the robot and the target object to be operated is less than or equal to the first distance according to the location information of the fixed portion of the first mechanical arm. If the fixed portion of the first mechanical arm of the robot is within the first location area, or the distance between the fixed portion of the first mechanical arm of the robot and the target object to be operated is less than or equal to the first distance, the procedure goes to block S706; otherwise, procedure goes to blocks S705 to S706.

At block S705, transmitting the moving control instruction to the robot, to control the robot to move, until the fixed portion of the first mechanical arm of the robot is within the first location area, or until the distance between the fixed portion of the first mechanical arm and the target object to be operated is less than or equal to the first distance.

In at least one embodiment, when the fixed portion of the first mechanical arm of the robot is beyond the first location area, or the distance between the fixed portion of the first mechanical arm and the target object to be operated is greater than the first distance, the control terminal transmits the moving control instruction to the robot, to control the robot to move, until the fixed portion of the first mechanical arm of the robot is within the first location area, or until the distance between the fixed portion of the first mechanical arm and the target object to be operated is less than or equal to the first distance.

At block S706, transmitting the control instruction for operating the target object to be operated and an instruction for invoking trajectory parameters of the end effector of the first mechanical arm relative to the target object to be operated to the robot, to control the robot to operate the target object to be operated.

The trajectory parameters of the end effector of the first mechanical arm relative to the target object to be operated to the robot can be stored in the memory of the robot or a memory of the control terminal.

In at least one embodiment, when the fixed portion of the first mechanical arm of the robot is within the first location area, or the distance between the fixed portion of the first mechanical arm and the target object to be operated is less than or equal to the first distance, the control terminal transmits the control instruction for operating the target object to be operated and an instruction for invoking trajectory parameters of the end effector of the first mechanical arm relative to the target object to be operated to the robot, to control the robot to operate the target object to be operated.

At block S707, receiving the notice information.

In at least one embodiment, when the robot dose not identify the target object to be operated in the surrounding environment, the robot may output the notice information to the control terminal, to notice that a failure of identifying the target object to be operated. When the control terminal receives the notice information, the control terminal may display the notice information on the control panel.

Figure 8:
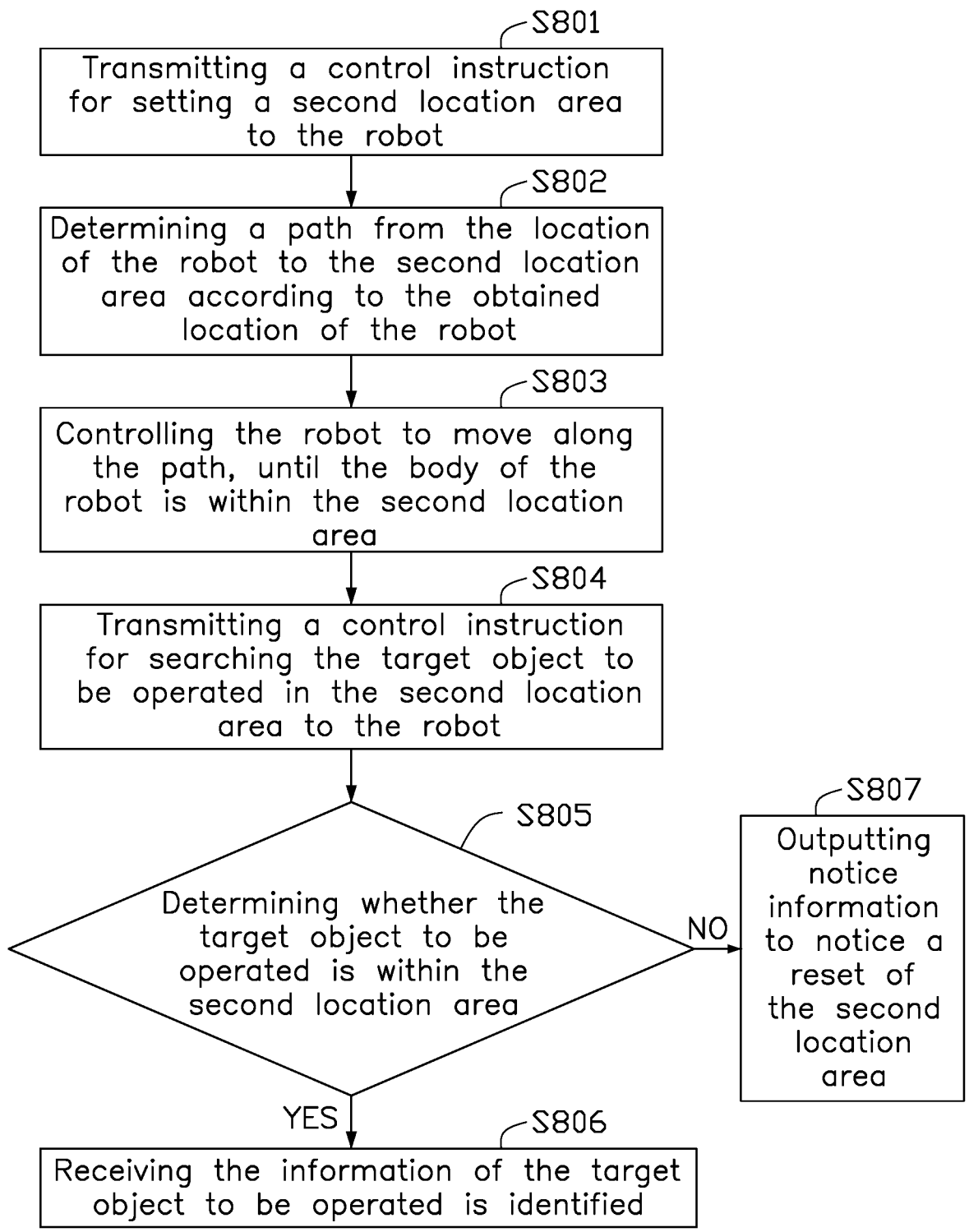
FIG. 8 illustrates a flow chart of at least one embodiment of the method for controlling robot before a block S701 of the method as shown in FIG. 7.

FIG. 8 illustrates a flow chart before the block S701 of the method for controlling robot as shown in FIG. 7. The method may further include:

At block S801, transmitting a control instruction for setting a second location area to the robot.

The second location area is a location area in the second map interface marked by the identified touch operation on the control terminal. The control instruction for setting a second location area is configured to control the robot to move to the second location area.

In at least one embodiment, the user may touch or click the predetermined application of the control terminal, a home page of the predetermined application may show the second map interface, the second map interface shows stored map information. Then, the user may mark one or more location area in the second map interface, such as sliding on the second map interface by the fingers to form one or more closed pattern (such as circle, oval, polygon, etc.), a location area covered by the closed pattern is the second location area marked by the user.

When the closed pattern is partially overlapped with a target area, if an overlapped rate is greater than a predetermined threshold value, determining the closed pattern to be the second location area. The target area is a location area where the target object to be operated located in. The overlapped rate is a ratio of a size of the overlapped area of the closed pattern and the target area occupies a whole size of the closed pattern. For instance, the target area is a room, the target object to be operated is in the room, the user may mark a closed pattern in the second map interface, the closed pattern is partially overlapped with the room. The control terminal may convert an actual size of the closed pattern in the surrounding environment according to a measuring scale of the second map interface, calculate a ratio of the size of the overlapped area of the closed pattern and the room occupies the whole size of the closed pattern, to obtain the overlapped rate. When the overlapped rate is greater than the predetermined threshold value (such as 0.8), the control terminal determines the closed pattern to be the second location area.

The predetermined threshold value may be set according to actual scene, which is not limited.

After the second location area is marked, triggering the control instruction for setting the second location area, controlling the control terminal to transmit the control instruction for setting a second location area to the robot.

At block S802, determining a path from the location of the robot to the second location area according to the obtained location of the robot.

In at least one embodiment, the robot, in response to the control instruction for setting a second location area to the robot, transmits its location information to the control terminal. The control terminal receives the location information of the robot, to obtain the location of the robot in the second map interface. Then, the control terminal displays one or more paths from the location of the robot to the second location area.

In at least one embodiment, selecting a third path from the one or more paths. The third path may be a track of a path or a section of the track of a path. For instance, if the third path is a section of the track of a path, after the robot moved along the third path, the control terminal controls the robot to move on along the path.

At block S803, controlling the robot to move along the path, until the body of the robot is within the second location area.

After the control terminal determined a path from the location of the robot to the second location area, the control terminal transmits the path information to the robot. After the robot receives the path information, the robot moves along the path, until the body of the robot closes to or within the second location area.

In at least one embodiment, after the control terminal determined a plurality of paths from the location of the robot to the second location area, the control terminal may randomly select one path from the plurality of paths, or select a shortest path from the plurality of paths, so as to control the robot to move along the path selected by the control terminal.

In other embodiments, when the second map interface displays the plurality of paths from the location of the robot to the second location area, the user may click one of the plurality of paths, so as to control the robot to move along the path selected by the user.

At block S804, transmitting a control instruction for searching the target object to be operated in the second location area to the robot.

The control instruction for searching the target object to be operated in the second location area is configured to control the robot to search the target object to be operated in the second location area.

In at least one embodiment, when the body of the robot is within the second location area, the user may trigger the control instruction for searching the target object to be operated in the second location area through the control terminal, then the control terminal to transmit the control instruction for searching the target object to be operated in the second location area to the robot.

The user may trigger the control instruction for searching the target object to be operated in the second location area by following ways: audio/text input, touch operation, etc. For instance, the user may input a name or a feature (such as a shape, a size, a color, etc.) of the target object to be operated in a predetermined item of the control terminal, so as to trigger the control instruction for searching the target object to be operated. For instance, the user may make an audio content in an audio sensing range of the control terminal, the control terminal receives the audio content through the audio module thereof, converts the audio content into text content, and obtains the control instruction for searching the target object to be operated by keyword or semantic analysis. For instance, the user may trigger a predetermined control of the control terminal through trigger operation, the control is corresponding to the control instruction for searching the target object to be operated, so as to trigger the control instruction for searching the target object to be operated.

At block S805, determining whether the target object to be operated is within the second location area.

In at least one embodiment, after the control terminal transmitted the control instruction for searching the target object to be operated to the robot, the robot, in response to the control instruction, obtains features of the target object to be operated, captures an image of the surrounding environment through the vision sensor, and determines an object matches the features of the target object to be operated in the image. When there is no object matches the features of the target object to be operated in the image, the robot adjusts the vision sensor to another angle or another location to continuously capturing, until finishing the capture of environment images in the second location area. When one image of the second location area includes an object matches the features of the target object to be operated, the robot determines the object to be the target object to be operated and transmits information of the target object to be operated is identified to the control terminal, the control terminal determines the target object to be operated is within the second location area accordingly. When not anyone of the images of the second location area includes the object matches the features of the target object to be operated, the robot determines there is no target object to be operated in the second location area and transmits information of the target object to be operated is not identified to the control terminal, the control terminal determines the target object to be operated is beyond the second location area accordingly.

In the block S805, if the target object to be operated is within the second location area, the procedure goes to block S806; otherwise, the procedure goes to block S807.

At block S806, receiving the information of the target object to be operated is identified.

In at least one embodiment, when the control terminal determines the target object to be operated is within the second location area, the user may trigger a receive identify instruction on the control terminal and transmit the receive identify instruction to the robot. After the robot identifies the target object to be operated, the robot transmits the information of the target object to be operated is identified to the control terminal.

At block S807, outputting notice information to notice a reset of the second location area.

In at least one embodiment, when the control terminal determines the target object to be operated is beyond the second location area, the control terminal outputs the notice information. The notice information is configured to notice a reset of the second location area.

In at least one embodiment, user may use the control terminal to transmit the control instruction to the robot, the robot execute the task in response to the control instruction. The user may use the control terminal to conveniently control the robot (such as the remote-control robot), and use the control terminal to intuitively observe the functions, the location, and the status (such as remaining power, sleep status, etc.) of the robot, which has a good user experience.

Figure 9:
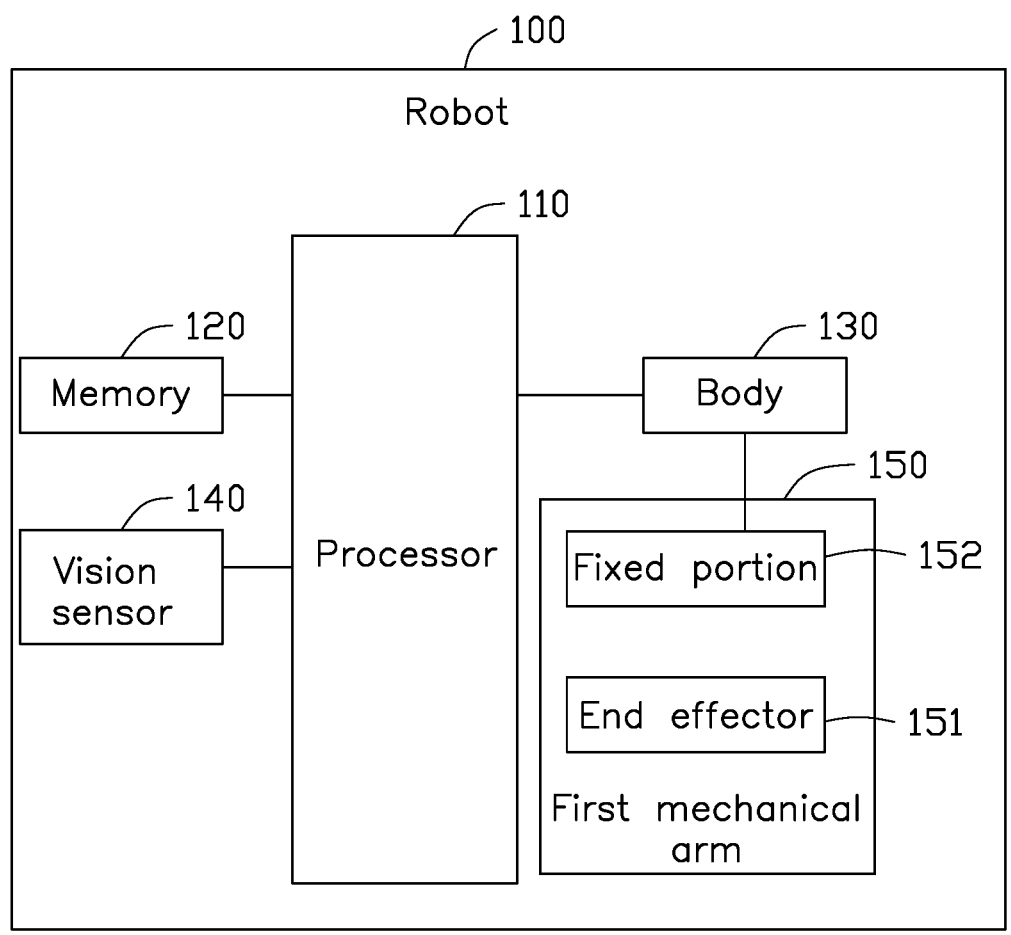
FIG. 9 illustrates a schematic diagram of at least one embodiment of a robot according to the present disclosure.

A robot is provided according to a third aspect of the present disclosure. FIG. 9 illustrates a schematic diagram of a robot 100.

Referring to FIG. 9, the robot 100 may include a processor 110, a memory 120, a body 130, a vision sensor 140, and a first mechanical arm 150. The first mechanical arm 150 includes an end effector 151 and a fixed portion 152. The fixed portion 152 is connected to the body 130.

The processor 110 in response to the identifying instruction of the target object to be operated. The vision sensor 140 captures visual information of surrounding environment. When the vision sensor 140 identifies the target object to be operated, the processor 110 determines whether the fixed portion 152 of the first mechanical arm 150 is within the first location area, or determining whether the distance between the fixed portion 152 of the first mechanical arm 150 and the target object to be operated is less than or equal to the first distance. The first location area is a location area of the end effector 151 of the first mechanical arm 150 can reach and operate the target object to be operated directly or through a tool. The first distance is a maximum distance of the end effector 151 of the first mechanical arm 150 can reach and operate the target object to be operated directly or through a tool. If the fixed portion 152 of the first mechanical arm 150 is beyond the first location area, the processor 110 control the body 130 to move according to the control instruction, until the fixed portion 152 of the first mechanical arm 150 is within the first location area, or until the distance between the fixed portion 152 of the first mechanical arm 150 and the target object to be operated is less than or equal to the first distance. If the fixed portion 152 of the first mechanical arm 150 is within the first location area, or the distance between the fixed portion 152 of the first mechanical arm 150 and the target object to be operated is less than or equal to the first distance, the processor 110, in response to the control instruction for operating the target object to be operated and the instruction for invoking trajectory parameters of the end effector 151 of the first mechanical arm 150 relative to the target object to be operated, invokes the trajectory parameters of the end effector 151 of the first mechanical arm 150 relative to the target object to be operated from the memory 120, and obtains the target posture of the end effector 151 of the first mechanical arm 150 relative to the target object to be operated, and controls the end effector 151 of the first mechanical arm 150 to reach and operate the target object to be operated directly or through a tool according to the trajectory parameters and the target posture.

The robot 100 can perform the method for controlling mechanical arm of the first aspect of the present disclosure, detail steps of the method and advantageous effect are omitted, which can be referred to the description above.

Figure 10:
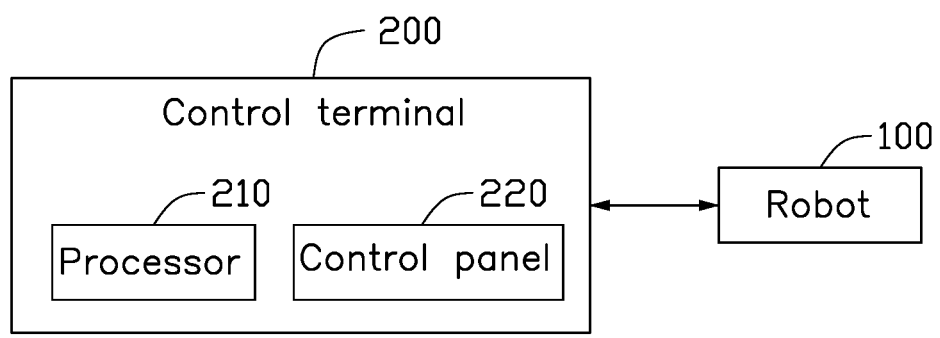
FIG. 10 illustrates a schematic diagram of at least one embodiment of a control terminal according to the present disclosure.

A control terminal for the robot is provided according to a fourth aspect of the present disclosure. FIG. 10 illustrates a schematic diagram of a control terminal 200. A scene of the control terminal 200 controlling the robot 100 as shown in FIG. 9 is set for example for further description.

Referring to FIG. 10, the control terminal 200 may include a processor 210 and a control panel 220. If the processor 210 receives identified information of the target object to be operated, the control panel 220 controls the first map interface to display the location information of the target object to be operated, the first location area corresponding to the target object to be operated, or the distance between the fixed portion 152 of the first mechanical arm 150 of the robot 100 and the target object to be operated, and the location information of the fixed portion 152 of the first mechanical arm 150 of the robot 100. The first location area is a location area of the end effector 151 of the first mechanical arm 150 of the robot 100 can reach and operate the target object to be operated directly or through a tool. If the fixed portion 152 of the first mechanical arm 150 of the robot 100 is beyond the first location area, or the distance between the fixed portion 152 of the first mechanical arm 150 of the robot 100 and the target object to be operated is greater than the first distance, the processor 210 transmits the moving control instruction to the robot 100, to control the robot 100 to move, until the fixed portion 152 of the first mechanical arm 150 of the robot 100 is within the first location area, or until the distance between the fixed portion 152 of the first mechanical arm 150 of the robot 100 and the target object to be operated is less than or equal to the first distance. The first distance is a maximum distance of the end effector 151 of the first mechanical arm 150 of the robot 100 can reach and operate the target object to be operated directly or through a tool. If the fixed portion 152 of the first mechanical arm 150 of the robot 100 is within the first location area, or the distance between the fixed portion 152 of the first mechanical arm 150 of the robot 100 and the target object to be operated is less than or equal to the first distance, the processor 210 transmits the control instruction for operating the target object to be operated and an instruction for invoking trajectory parameters of the end effector 151 of the first mechanical arm 150 of the robot 100 relative to the target object to be operated to the robot 100, to control the robot 100 to operate the target object to be operated.

The control terminal 200 can perform the method for controlling robot of the second aspect of the present disclosure, detail steps of the method and advantageous effect are omitted, which can be referred to the description above.

It should be known that, the structure shown in the embodiment of the present disclosure does not constitute a specific limitation on the robot and the control terminal. In other embodiments of the present disclosure, the robot and the control terminal may include more or fewer components than shown in the figures, or combine certain components, or separate certain components, or arrange different components.

Figure 11:
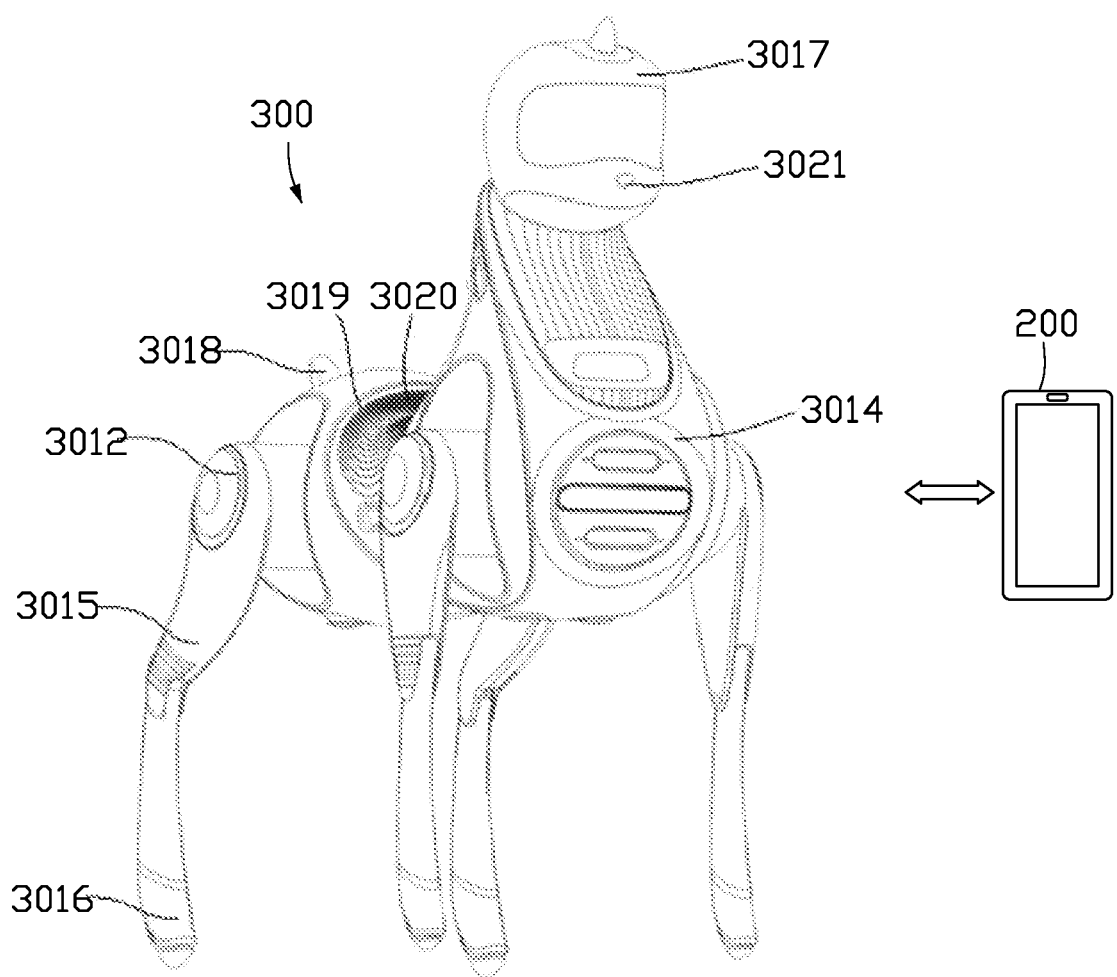
FIG. 11 illustrates a schematic diagram of at least one embodiment of a scene of the control terminal controlling a multilegged robot according to the present disclosure.

For instance, referring to FIG. 11, FIG. 11 illustrates a schematic diagram of a scene of the control terminal 200 controlling the multilegged robot 300.

Referring to FIG. 11, the multilegged robot 300 may include a main body 3014, extendable legs 3015 and feet 3016. In other embodiments, the mechanical structure 3013 may further include a mechanical arm (not shown in the figures), a rotatable head structure 3017, a shakable tail structure 3018, a holder structure 3019, a saddle structure 3020, a camera structure 3021, etc.

It should be noted that, a quantity of each of the components of the multilegged robot 300 can be one or more, which can be arranged according to actual situation, such as a quantity of the legs 3015 can be four, each of the legs 3015 may be arranged with three electromotors 3012, so a quantity of the electromotors 3012 can be twelve.

It can be understood that the multilegged robot 300 can implement all the method steps of the method for controlling mechanical arm provided in the first aspect of the present disclosure, and the same method steps and beneficial effects will not be repeated here.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A method for controlling mechanical arm applied in a robot, the robot comprising a first mechanical arm, the first mechanical arm comprising a fixed portion and an end effector, the fixed portion connected to a body of the robot, the method comprising:
receiving an instruction to identify a target object to be operated;
responsive to that a target object is identified, determining whether the fixed portion of the first mechanical arm of the robot is within a first location area, or determining whether a distance between the fixed portion of the first mechanical arm of the robot and the target object is less than or equal to a first distance; wherein the first location area is a location range of the end effector of the first mechanical arm is capable of reaching and operating the target object directly or through a tool, the first distance is a maximum distance of the end effector of the first mechanical arm is capable of reaching and operating the target object directly or through a tool;
responsive to that the fixed portion of the first mechanical arm of the robot is beyond the first location area, or the distance between the fixed portion of the first mechanical arm and the target object to be operated is longer than the first distance, controlling the robot to move according to a moving control instruction, until the fixed portion of the first mechanical arm of the robot is within the first location area, or until the distance between the fixed portion of the first mechanical arm and the target object is less than or equal to the first distance; and responsive to that the fixed portion of the first mechanical arm of the robot is within the first location area, or the distance between the fixed portion of the first mechanical arm and the target object to be operated is less than or equal to the first distance, receiving a control instruction for operating the target object, invoking trajectory parameters of the end effector of the first mechanical arm relative to the target object, and obtaining a target posture of the end effector of the first mechanical arm relative to the target object, controlling the end effector of the first mechanical arm to reach and operate the target object directly or indirectly through a tool according to the trajectory parameters and the target posture;

wherein before the processor controls the robot to move according to the moving control instruction, until the fixed portion of the first mechanical arm of the robot is within the first location area, or until the distance between the fixed portion of the first mechanical arm and the target object is less than or equal to the first distance, the processor obtains a force sensing signal of an external force received by the body or the first mechanical arm of the robot;

the processor obtains a series of velocity control values of the moving of the robot according to a deviation of the force sensing signals of the robot in various dimensions;

the processor controls the robot to move according to the velocity control values, until the fixed portion of the first mechanical arm of the robot is within the first location area, or the distance between the fixed portion of the first mechanical arm of the robot and the target object is less than or equal to the first distance; and the memory stores a plurality of third trajectories of the moving of the robot.

2. The method according to claim 1, wherein before receiving the identifying instruction to identify the target object to be operated, the method further comprises:

storing a plurality of first trajectories of the end effector of the first mechanical arm when the first mechanical arm is dragged by an external force; and obtaining the trajectory parameters according to the plurality of the first trajectories;

the first trajectory is a trajectory of the end effector of the first mechanical arm moving from beginning to reaching and operating the target object directly or through a tool under an action of the external force.

3. The method according to claim 2, wherein controlling the end effector of the first mechanical arm to reach and operate the target object directly or through a tool according to the trajectory parameters and the target posture, further comprises:

calculating a sequence of predicted trajectory points according to the trajectory parameters and the target posture, forming a second trajectory, and storing the second trajectory;

controlling the end effector to move according to the second trajectory, until the end effector reaches and operates the target object directly or through a tool.

4. The method according to claim 1, wherein obtaining the series of velocity control values of the moving of the robot according to the deviation of the force sensing signals of the robot in various dimensions, further comprises:

processing linear regression to the force sensing signals according to a predetermined dynamical model to obtain a regression matrix and a parameter set;

optimizing the parameter set using a least square method to obtain a least parameter set;

calculating a torque signal according to the least parameter set and the regression matrix; and obtaining the velocity control values of the moving of the robot according to a difference between the force sensing signals in various dimensions and the torque signal.

5. The method according to claim 1, wherein after receiving the instruction to identify the target object, responsive to that a target object is identified, the method further comprises:

obtaining information of the target object;

the information of the target object comprises visual information and location information; the visual information comprises depth images of the target object, the location information comprises location information of the target object and the robot in a map interface, the map interface is displayed by a display panel of the robot.

6. The method according to claim 5, wherein receiving the control instruction for operating the target object, invoking trajectory parameters of the end effector of the first mechanical arm relative to the target object, and obtaining the target posture of the end effector of the first mechanical arm relative to the target object, further comprises:

obtaining a first posture of the target object relative to the body of the robot according to the visual information;

obtaining a second posture of the end effector of the first mechanical arm relative to the body of the robot; and obtaining the target posture of the end effector of the first mechanical arm relative to the target object according to the first posture and the second posture.

7. A robot comprising a body, a processor, a memory, a vision sensor, and a first mechanical arm, the first mechanical arm comprising a fixed portion and an end effector, the fixed portion connected to a body of the robot; wherein the processor receives an instruction to identify a target object to be operated, the vision sensor obtains visual information of surrounding environment;

responsive to that the vision sensor identifies a target object, the processor determines whether the fixed portion of the first mechanical arm of the robot is within a first location area, or determines whether a distance between the fixed portion of the first mechanical arm of the robot and the target object is less than or equal to a first distance; the first location area is a location range of the end effector of the first mechanical arm is capable of reaching and operating the target object directly or through a tool, the first distance is a maximum distance of the end effector of the first mechanical arm is capable of reaching and operating the target object directly or through a tool;

responsive to that the fixed portion of the first mechanical arm of the robot is beyond the first location area, or the distance between the fixed portion of the first mechanical arm and the target object to be operated is longer than the first distance, the processor controls the robot to move according to a moving control instruction, until the fixed portion of the first mechanical arm of the robot is within the first location area, or until the distance between the fixed portion of the first mechanical arm and the target object to be operated is less than or equal to the first distance; and responsive to that the fixed portion of the first mechanical arm of the robot is within the first location area, or the distance between the fixed portion of the first mechanical arm and the target object to be operated is less than or equal to the first distance, the processor receives a control instruction for operating the target object, invokes trajectory parameters of the end effector of the first mechanical arm relative to the target object to be operated, and obtains a target posture of the end effector of the first mechanical arm relative to the target object to be operated, controls the end effector of the first mechanical arm to reach and operate the target object directly or indirectly through a tool according to the trajectory parameters and the target posture;

wherein before the processor controls the robot to move according to the moving control instruction, until the fixed portion of the first mechanical arm of the robot is within the first location area, or until the distance between the fixed portion of the first mechanical arm and the target object is less than or equal to the first distance, the processor obtains a force sensing signal of an external force received by the body or the first mechanical arm of the robot;

the processor obtains a series of velocity control values of the moving of the robot according to a deviation of the force sensing signals of the robot in various dimensions;

the processor controls the robot to move according to the velocity control values, until the fixed portion of the first mechanical arm of the robot is within the first location area, or the distance between the fixed portion of the first mechanical arm of the robot and the target object is less than or equal to the first distance; and the memory stores a plurality of third trajectories of the moving of the robot.

8. The robot according to claim 7, wherein before the processor receives the identifying instruction to identify the target object, the memory stores a plurality of first trajectories of the end effector of the first mechanical arm when the first mechanical arm is dragged by an external force; and the processor obtains trajectory parameters according to the plurality of the first trajectories;

the first trajectory is a trajectory of the end effector of the first mechanical arm moving from beginning to reaching and operating the target object directly or through a tool under an action of the external force.

9. The robot according to claim 8, wherein the processor controls the end effector of the first mechanical arm to reach and operate the target object directly or through a tool according to the trajectory parameters and the target posture, further comprises:

the processor calculates a sequence of predicted trajectory points according to the trajectory parameters and the target posture and forming a second trajectory;

the memory stores the second trajectory;

the processor controls the end effector to move according to the second trajectory, until the end effector reaches and operates the target object directly or through a tool.

10. The robot according to claim 7, wherein the processor obtains the series of velocity control values of the moving of the robot according to the deviation of the force sensing signals of the robot in various dimensions, further comprises:

the processor processes linear regression to the force sensing signals according to a predetermined dynamical model to obtain a regression matrix and a parameter set;

the processor optimizes the parameter set using a least square method to obtain a least parameter set;

the processor calculates a torque signal according to the least parameter set and the regression matrix; and the processor obtains the velocity control values of the moving of the robot according to a difference between the force sensing signals in various dimensions and the torque signal.

11. The robot according to claim 7, further comprising a display panel, wherein after the processor receives the instruction to identify the target object, responsive to that a target object is identified, the processor obtains information of the target object;

the information of the target object comprises visual information and location information; the visual information comprises depth images of the target object, the location information comprises location information of the target object and the robot in a map interface, the display panel displays the map interface.

12. The robot according to claim 11, wherein the processor receives the control instruction for operating the target object, invokes trajectory parameters of the end effector of the first mechanical arm relative to the target object, and obtains the target posture of the end effector of the first mechanical arm relative to the target object, further comprises:

the processor obtains a first posture of the target object relative to the body of the robot according to the visual information;

the processor obtains a second posture of the end effector of the first mechanical arm relative to the body of the robot; and the processor obtains the target posture of the end effector of the first mechanical arm relative to the target object according to the first posture and the second posture.

13. A control terminal of a robot, the robot comprising a first mechanical arm, the first mechanical arm comprising a fixed portion and an end effector, the fixed portion connected to a body of the robot, the control terminal comprising a processor and a control panel, wherein:

when the processor receives identified information of a target object to be operated, the control panel displays location information of the target object, a first location area corresponding to the target object, or a distance between the fixed portion of the first mechanical arm of the robot and the target object, and location information of the fixed portion of the first mechanical arm in a first map interface; the first location area is a location area of the end effector of the first mechanical arm is capable of reaching and operating the target object directly or through a tool;

when the fixed portion of the first mechanical arm of the robot is beyond the first location area, or the distance between the fixed portion of the first mechanical arm and the target object is greater than the first distance, the processor transmits moving control instruction to the robot, to control the robot to move, until the fixed portion of the first mechanical arm of the robot is within the first location area, or until the distance between the fixed portion of the first mechanical arm and the target object is less than or equal to the first distance; the first distance is a maximum distance of the end effector of the first mechanical arm is capable of reaching and operating the target object directly or through a tool; and when the fixed portion of the first mechanical arm of the robot is within the first location area, or the distance between the fixed portion of the first mechanical arm and the target object is less than or equal to the first distance, the processor transmits a control instruction for operating the target object and an instruction for invoking trajectory parameters of the end effector of the first mechanical arm relative to the target object to the robot, to control the robot to operate the target object;

wherein before the processor receives identified information of the target object, the processor transmits the identifying instruction to the robot and determines whether the identified information of the target object is received;

when the processor does not receive the identified information of the target object, the processor receives notice information from the robot, the control panel displays the notice information, the notice information is configured to notice that a failure of identifying the target object.

14. The control terminal according to claim 13, wherein before the processor receives the identified information of the target object, the processor transmits a control instruction for setting a second location area to the robot, determines a trajectory from the location of the robot to the second location area according to the obtained location of the robot; the second location area is a location area in a second map interface marked by an identified touch operation on the control terminal;

the processor controls the robot to move along the trajectory, until the body of the robot is within the second location area, the processor transmits a control instruction for searching the target object in the second location area to the robot, to determine whether the target object is within the second location area;

when the target object to be operated is within the second location area is determined, the processor receives the information of the target object, the processor identifies the information of the target object; and when the target object to be operated is beyond the second location area is determined, the processor outputs notice information to notice a reset of the second location area.

15. The control terminal according to claim 14, wherein the processor transmits the control instruction for setting a second location area to the robot, further comprises:

the control panel receives one or more closed pattern through the second map marked by a user, a location area covered by the closed pattern is the second location area;

when the closed pattern is partially overlapped with a target area, if an overlapped rate is greater than a predetermined threshold value, determining the closed pattern to be the second location area; the target area is a location area where the target object located in, the overlapped rate is a ratio of a size of the overlapped area of the closed pattern and the target area occupies a whole size of the closed pattern.

16. The control terminal according to claim 14, wherein the processor transmits a control instruction for setting a second location area to the robot, determines a path from the location of the robot to the second location area according to the obtained location of the robot, further comprises:

the processor receives location information from the robot to obtain a location of the robot in the second map interface, the control terminal displays one or more paths from the location of the robot to the second location area;

the processor selects a third path from the one or more paths; the third path is a track of a path or a section of the track of a path.

17. The control terminal according to claim 14, wherein the processor controls the robot to move along the path, further comprises:

after the processor determined a plurality of paths from the location of the robot to the second location area, the processor randomly selects one path from the plurality of paths, or selects a shortest path from the plurality of paths, and controls the robot to move along the path.

* * * * *